(12) United States Patent
Stone et al.

(10) Patent No.: US 6,570,761 B2
(45) Date of Patent: *May 27, 2003

(54) HEAT DISSIPATION STRUCTURE FOR ELECTRONIC APPARATUS COMPONENT

(75) Inventors: Lawrence A. Stone, Cypress, TX (US); Jeffrey A. Lev, Houston, TX (US); Curt L. Progl, Montgomery, TX (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/109,388

(22) Filed: Mar. 28, 2002

(65) Prior Publication Data

US 2002/0097558 A1 Jul. 25, 2002

Related U.S. Application Data

(60) Provisional application No. 09/123,092, filed on Jul. 27, 1998, now Pat. No. 6,366,460.

(51) Int. Cl.[7] .................................................. G06F 1/16
(52) U.S. Cl. ........................ 361/687; 361/688; 361/701
(58) Field of Search ................................. 361/687–711

(56) References Cited

U.S. PATENT DOCUMENTS

| | | | | |
|---|---|---|---|---|
| 4,012,770 A | * | 3/1977 | Pravda et al. ................. 357/82 |
| 5,339,214 A | * | 8/1994 | Nelson ......................... 361/695 |
| 5,969,940 A | * | 10/1999 | Sano et al. ................... 361/687 |
| 6,352,103 B1 | * | 3/2002 | Chu et al. ................... 165/80.3 |

* cited by examiner

Primary Examiner—Darren Schuberg
Assistant Examiner—Yean-Hsi Chang

(57) ABSTRACT

A computer microprocessor has a housing portion with a recess formed in a top side wall thereof, and a die portion inset within the recess. Operating heat from the die is removed by heat dissipation apparatus which automatically adapts to variations in the microprocessor bond line thickness and includes a sheet metal EMI shield wall overlying the microprocessor and having a condensing end portion of a thermosyphoning heat pipe secured to its bottom side, with an evaporating end portion of the heat pipe overlying the die recess and being resiliently deflectable toward a phase change thermal pad mounted on the top side of the die and inset into the housing die recess. A metal heat sink member is rotatably mounted on the heat pipe evaporating end portion and has a flat bottom side and an arcuate top side. The heat sink member is resiliently deflected into the die recess, and has its flat bottom side resiliently pressed against the thermal interface pad, by a spring plate portion of a clamping structure downwardly engaging the arcuate top side of the heat sink member. During operation of the microprocessor, die heat is transferred to the metal shield wall sequentially through the thermal pad, the heat sink member, and the heat pipe and then dissipated from the shield wall using fan-generated cooling air flowed along the shield wall.

20 Claims, 4 Drawing Sheets

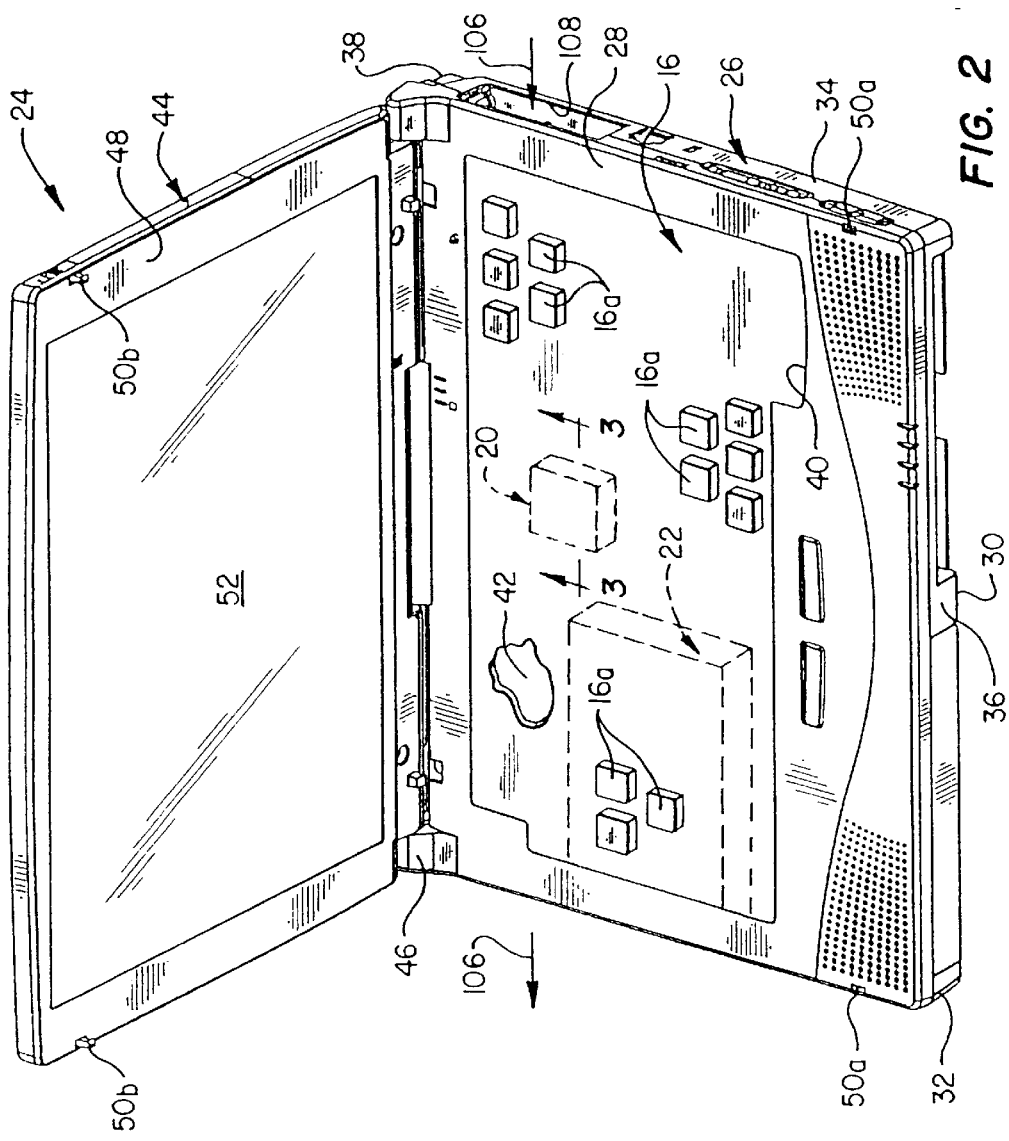
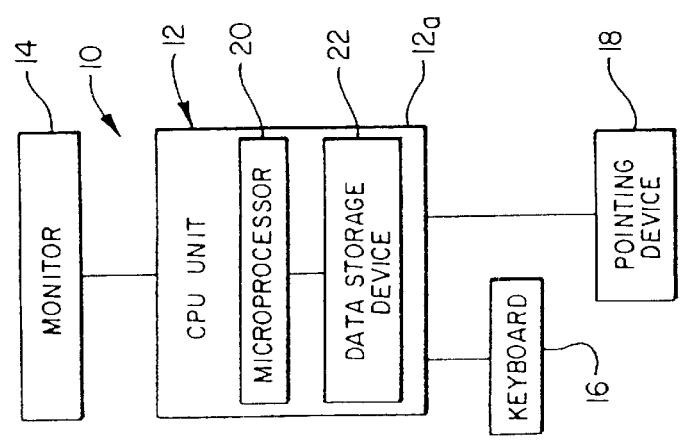

HEAT DISSIPATION STRUCTURE FOR ELECTRONIC APPARATUS COMPONENT

This application is a Continuation of application Ser. No. 09/123,092, filed Jul. 27, 1998, now U.S. Pat. No. 6,366,460.

BACKGROUND OF THE INVENTION

1. Field of the Invention

The present invention generally relates to computer apparatus and, in a preferred embodiment thereof, more particularly relates to heat dissipation apparatus for computer microprocessors.

2. Description of Related Art

As computer microprocessors are provided with faster and faster clock speeds, the operating heat which these devices generate, and must be appropriately dissipated, correspondingly increases. The typical microprocessor used in a computer has a die portion (the microprocessor proper) which is exposed within a recessed area on the top side wall of the processor housing module (or "can") which is mounted on the computer's system board.

The operating heat from this type of recessed processor die has heretofore been dissipated using a die cast metal heat sink screwed down to the top side of the processor housing module over the recessed die. In order to provide the requisite heat transfer interface between the bottom side of the heat sink and the top side of the recessed die it was necessary to place a layer of thermal grease between the top side of the die and the underside of the metal heat sink. As is well known, while thermal grease provides a good heat conduction path between the die and the heat sink, it is considered to be an undesirable interface material from a manufacturing standpoint because it tends to be quite messy and is easily spread beyond its originally intended location.

A potentially better interface material is a compliant thermal interface pad compressed between the bottom side of the heat sink and the top side of the die. However, in practice the use of such a compliant thermal interface pad in lieu of thermal grease has not been practical with current high speed microprocessors of this general type due to two design criteria—namely, bond line thickness and die pressure.

Bond line thickness refers to the variable height between the top side of the recessed die and the top side of the processor housing, the variation in the bond line thickness arising due to manufacturing tolerances. To compensate for this dimensional variance in bond line thickness, and to provide the necessary compression of a compliant thermal interface pad, the thermal interface pad must have a thickness that undesirably reduces the amount of die operating heat conducted therethrough. Specifically, the pad must have an initial undeformed thickness that extends from the top side surface of the recessed die to above the top side of the processor housing. Additionally, at least one manufacturer of high speed microprocessors of this type is now specifying a maximum pressure which may be exerted on the die. Thus, particularly when the bond line thickness is at the low end of its manufacturing tolerance level, the compression of a thermal interface pad against the die by the overlying, rigidly attached die cast heat sink can easily exceed this maximum design pressure.

Thus, the use of thermal grease as the heat transfer interface between the heat sink structure and the top side of the die has been the only technique that compensates for bond line thickness variations, while at the same time preventing excess pressure from being exerted by the heat dissipation apparatus on the recessed die and providing a satisfactory heat conduction path between the die and the heat sink secured to the top side of the processor housing. The bond line thickness variation from processor to processor, of course, makes it quite difficult to apply the correct amount of thermal grease to ensure that an efficient thermal interface is provided between the die and the overlying heat sink, while at the same time avoiding the attendant mess of placing too much grease in the die recess. As a practical matter, the amount of grease must be that which generally corresponds to the lowest die level within the housing recess (as determined by the manufacturer's bond line thickness tolerance range). Thus, when the top side of the die is at the low end of the bond line thickness tolerance range (i.e., at its highest permissible point within the die recess), the applied quantity of thermal grease is more than is needed. This undesirably aggravates the tendency of thermal grease to "migrate" and generally create a mess.

As can readily be seen from the foregoing, a need exists for an improved technique for dissipating operating heat from a recessed microprocessor die, of the type generally described above, without the previous necessity of using thermal grease as the heat transfer interface between the top side surface of the die and the heat dissipation apparatus overlying the die. It is to this need that the present invention is directed.

SUMMARY OF THE INVENTION

In carrying out principles of the present invention, in accordance with a preferred embodiment thereof, electronic apparatus having a heat-generating component is provided with specially designed heat dissipation apparatus operative to dissipate operating heat from a surface of the component. From a broad perspective, the heat dissipation apparatus includes a heat transfer structure having a portion resiliently deflectable toward the surface; a heat sink member carried by the heat transfer structure portion, in thermal communication therewith, for resilient deflection therewith into heat-receiving proximity with the surface; and a force exerting structure operative to resiliently deflect the heat sink member into heat-receiving proximity with the surface.

The heat dissipation apparatus is illustratively incorporated in a computer system in the form of a portable notebook computer having a microprocessor and a data storage device operative to store data retrievable by the microprocessor. The microprocessor is the component with which the heat dissipation apparatus is operatively associated, and is of a type having a housing with an exterior wall having a recess formed therein, and a die portion inset within the recess and having a side surface from which the heat dissipation apparatus receives microprocessor operating heat.

In an illustrated preferred embodiment of the heat dissipation apparatus, the heat transfer structure includes a heat conductive support structure, representatively a sheet metal EMI shield wall, which overlies the processor housing die recess, and a thermosyphoning heat pipe. A condensing end portion of the heat pipe is flattened and is anchored to the underside of the shield wall, in a heat transfer relationship therewith, while the evaporating end of the heat pipe has a circular cross-section, overlies the die recess and is resiliently deflectable toward the side surface of the die. The flattening of the condensing portion of the heat pipe improves heat transfer from the heat pipe to the shield wall. While the condensing portion of the heat pipe is representatively placed in thermal communication with the shield wall, it could alternatively be placed in thermal communication with another heat-receiving structure such as, for example, a portion of the computer chassis.

The heat sink member is preferably secured to the evaporating end of the heat pipe for rotation relative thereto, and has a flat side which faces a thermal interface pad placed on the side surface of the die, and an opposite arcuate side. When the heat pipe evaporating end portion is resiliently deflected toward the die, the flat side of the heat sink member is pressed against the outer side surface of the thermal interface pad.

The force exerting structure is representatively a clamping structure carried by the microprocessor housing, and has a movable resilient spring plate member which may be clamped against the arcuate side surface of the heat sink member to move it into the die recess and resiliently clamp its flat side against the outer side of the thermal pad, thereby placing the heat sink member in operative heat-receiving proximity with the side surface of the die.

During operation of the microprocessor, die operating heat is transferred to the shield plate sequentially through the thermal pad, the heat sink member and the heat pipe. Operating heat received in this manner from the die is dissipated from the shield wall by a fan that flows air along the shield plate. Representatively, the microprocessor and the heat dissipation apparatus are disposed in the base housing of a portable notebook computer, and the fan operates to draw cooling air through the base housing, flow the air along opposite sides of the shield wall, and then discharge the heated air from the base housing.

The unique construction of the heat dissipation apparatus permits it to be operatively associated with the die without the undesirable use of thermal grease as the interface between the die and the heat dissipation apparatus. Instead, a thermal pad is used as such interface. Due to the variable movement of the heat sink member into the die recess, and the resilient clamping of the heat sink member against the thermal pad, the thermal pad can be quite thin, and does not have to extend outwardly from the die recess in its uncompressed state. Accordingly, the thickness of thermal pad may be minimally sized in a manner such that the pad provides a highly efficient conductive path between the die and the heat sink member.

Because the heat sink member is deflectable a variable distance into the die recess to bring the heat sink member into resiliently clamped contact with the thermal pad therein, the heat dissipation apparatus automatically compensates for variations in the bond line distance of the microprocessor. Additionally, since the clamping structure resiliently clamps the heat sink member against the thermal interface pad, excessive pressure forces on the die may easily be avoided. The use of the resilient spring plate member facilitates the avoidance of the exertion of excess clamping pressure on the die.

The heat dissipation apparatus is self-adjusting in yet another manner due to the rotatable mounting of the heat sink member on the resiliently deflectable heat pipe evaporating end portion, and the configuration of the heat sink member. Specifically, in the event that the flat bottom side of the heat sink member is not precisely parallel to the top side of the die before the clamping structure is used to press the heat sink member against the thermal pad, the subsequent resilient downward force of the spring plate member on the curved upper side of the heat sink member will automatically pivot the heat sink member about the heat pipe evaporating end portion, when the bottom side of the heat sink member initially contacts the thermal pad, in a manner such that the flat bottom side of the heat sink member bears against the thermal pad in a precisely parallel relationship with the top side of the heat-generating processor die.

While the heat dissipation apparatus of the present invention is representatively utilized in conjunction with a recessed processor die, it could also be utilized to advantage in a wide variety of other heat dissipation applications as well, and is not in any manner limited to removing operating heat from a recessed processor die.

BRIEF DESCRIPTION OF THE DRAWINGS

FIG. 1 is a schematic diagram of a representative computer system in which the present invention is incorporated;

FIG. 2 is a simplified, partially cut away perspective view of a portable notebook computer embodiment of the computer system;

DETAILED DESCRIPTION

Figure 3:
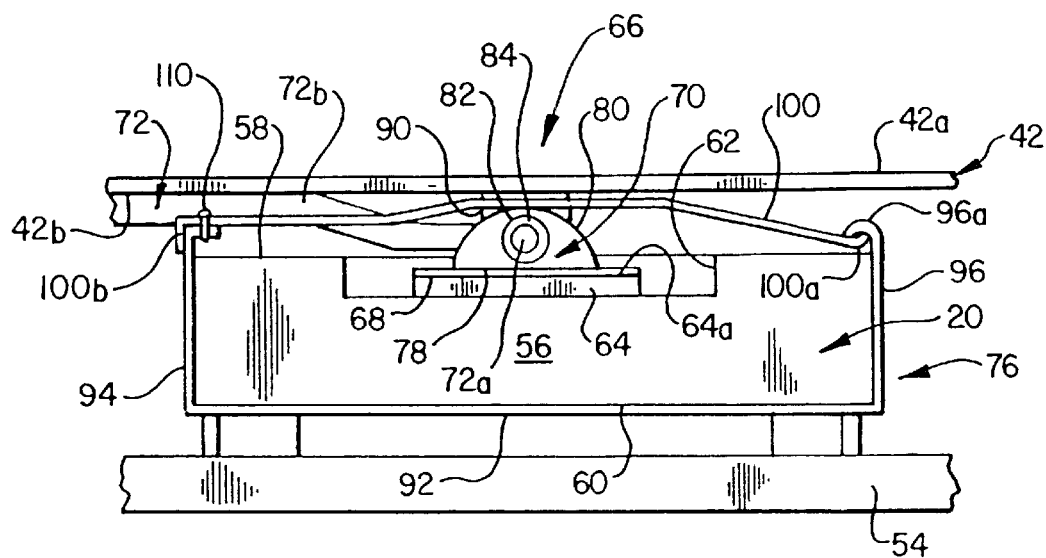
FIG. 3 is an enlarged scale schematic cross-sectional view through a microprocessor portion of the portable computer, taken along line 3—3 of FIG. 2, and additionally illustrates specially designed heat dissipation apparatus operatively associated with the microprocessor and embodying principles of the present invention.

Schematically depicted in FIG. 1 is a computer system 10 which includes a CPU unit 12 operatively connected to a monitor 14, a keyboard 16 and a pointing device 18 and having a microprocessor 20 and a data storage device, representatively a hard disk drive 22, operative to store data retrievable by the microprocessor 20. The microprocessor 20 and the data storage device 22 are disposed within a housing portion 12a of the CPU unit 12.

Figure 4:
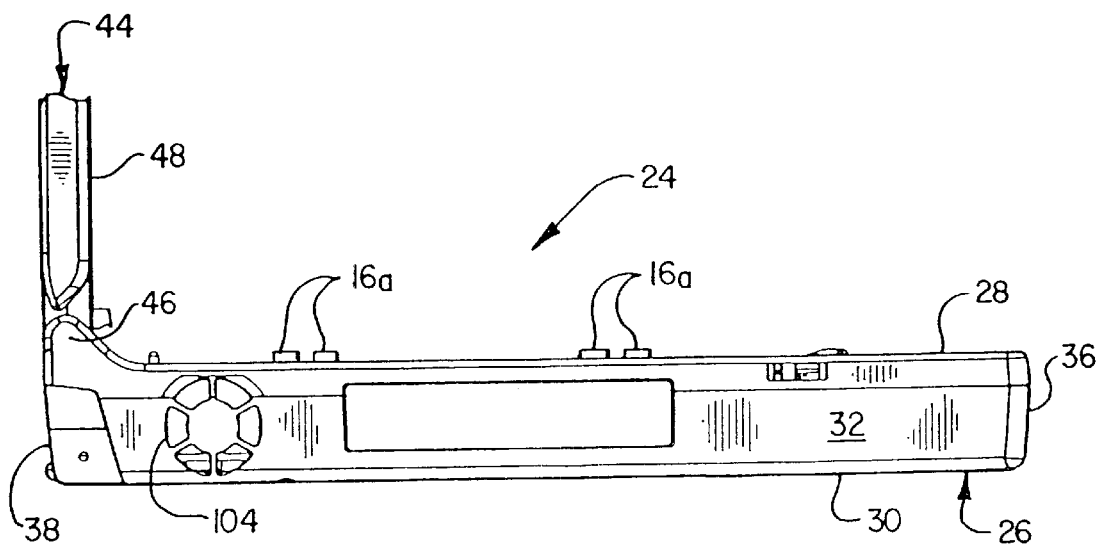
FIG. 4 is an enlarged scale partial left end elevational view of the portable computer.

The computer system 10 is representatively embodied in a portable notebook computer 24, illustrated in FIGS. 2 and 4, in which the microprocessor 20 and the hard disk drive 22 are disposed within a rectangular base housing 26 having top and bottom side walls 28 and 30, left and right end walls 32 and 34, and front and rear side walls 36 and 38. The base housing 26 and its internal components thus form the CPU unit 12 schematically depicted in FIG. 1.

The keyboard 16 has a series of manually depressible keys 16a and is positioned within an opening 40 formed in the top side wall 28 of the base housing 26 and overlies a sheet metal EMI shield wall 42 (see FIGS. 2, 3, 6 and 7) disposed within an upper interior side portion of the base housing 26 beneath the keyboard 16 and having upper and lower sides 42a,42b. The hard disk drive 22 underlies the shield wall 42 and is positioned adjacent the left end wall 32 of the base housing 26. Representatively, the microprocessor 20 is disposed somewhat to the right of the hard disk drive 22 beneath the shield wall 42. A conventional pointing stick (not shown) is positioned between a centrally oriented group of the keys 16a and forms the pointing device 18 schematically shown in the FIG. 1 diagram.

A relatively thin rectangular lid housing 44 is secured by a hinge mechanism 46 to a rear top side edge portion of the base housing 26 for pivotal movement relative thereto between an upwardly pivoted opened use orientation, shown in FIGS. 2 and 3, in which the front or inner side 48 of the lid housing 44 faces the user of the computer, and a downwardly pivoted closed position (not shown) in which the lid housing 44 extends across and covers the top side 28 of the base housing 26. Conventional cooperating latch structures 50a,50b respectively disposed on the base and lid housings 26 and 44 serve to releasably lock the lid housing 44 in its closed position. A display screen 52 is operatively carried on the front side 48 of the lid housing 44 which, with the display screen 52, forms the monitor portion 14 of the computer system 10 schematically depicted in FIG. 1.

Turning now to FIGS. 3 and 5–7, the microprocessor 20 underlies the EMI shield wall 42 and is secured to the top side of a main system board 54 (see FIG. 3). Microprocessor 20 has a relatively thin rectangular housing portion 56 disposed somewhat above the system board 54 and having opposite top and bottom sides 58 and 60. A generally rectangular recess 62 is centrally formed in the top housing portion side 56. The die portion 64 of the microprocessor 20, which generates the bulk of the microprocessor operating heat, is positioned on the bottom side of the recess 62 and has a top side 64a which is downwardly offset from the top side 58 of the housing 56 by a distance commonly referred to as the "bond line" distance of the microprocessor.

According to a key aspect of the present invention, specially designed heat dissipation apparatus 66 is thermally communicated with the die 64 to dissipate operating heat therefrom. As will be seen, the heat dissipation apparatus 66 efficiently carries away operating heat from the die 64 without the necessity of using thermal grease to form a heat transfer interface between the top side 64a of the die 64 and the heat dissipation apparatus, automatically compensates for variations in the bond line distance of the microprocessor 20, and resiliently maintains the thermal interface between the die and the heat dissipation apparatus in a manner preventing the creation of an impermissibly high mechanical contact pressure on the die 64.

In the illustrated preferred embodiment thereof, the heat dissipation apparatus 66 includes a thermal interface pad 68; an aluminum heat sink member or "slug" 70; a thermosyphoning heat pipe 72; the EMI shield wall 42; a schematically depicted cooling fan 74; and a clamping structure 76. The pad 68 (see FIG. 3) is disposed on the top side 64a of the die 64, and has a periphery aligned with the top side periphery of the die 64. If desired, the pad 68 could be a conventional phase change thermal interface pad.

The metal heat sink member 70 has opposite ends 70a and 70b, a partially circular cross-section along its length, a flat bottom side 78 that faces the top side of the thermal pad 68, an arcuate top side 80, and a circular opening 82 extending between its opposite ends 70a,70b.

Figure 7:
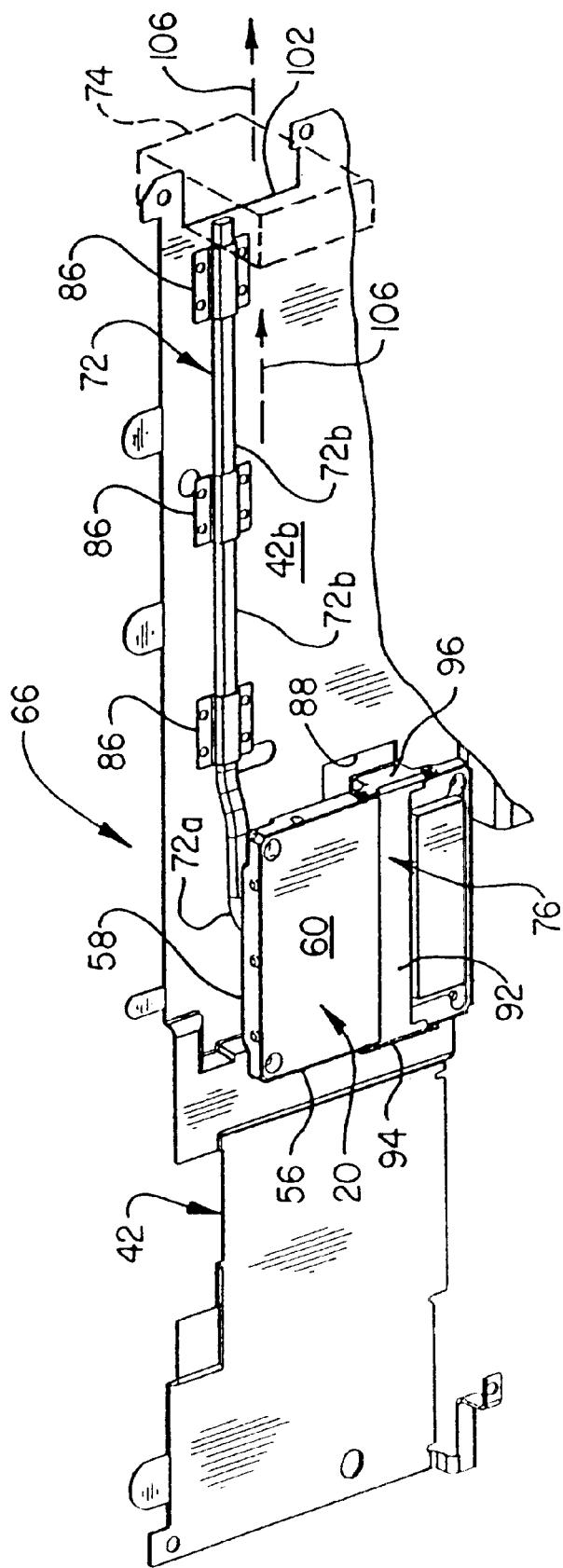
FIG. 7 is a bottom side perspective view of the microprocessor, the heat dissipation apparatus, and the shield wall portion shown in FIG. 6.

Thermosyphoning heat pipe 72 is of a conventional construction, forms with the shield wall 42 a heat transfer portion of the overall heat dissipation apparatus 55, and has a circularly cross-sectioned evaporating or heat-receiving end portion 72a journaled within the heat sink opening 82 and surrounded in the opening 82 by a thin layer of silicon free thermal grease 84, and a flattened condensing or heat-dissipating end portion 72b. Brackets 86 spaced apart along the length of the flattened heat pipe condensing end portion 72b secure it to the bottom shield wall side 42b, in thermal communication therewith, as best illustrated in FIG. 7. Alternatively, the condensing portion 72b of the heat pipe 72 could be secured to a heat sink other than the shield wall 42 such as, for example, a portion of the computer system chassis (not shown).

Figures 5, 6:
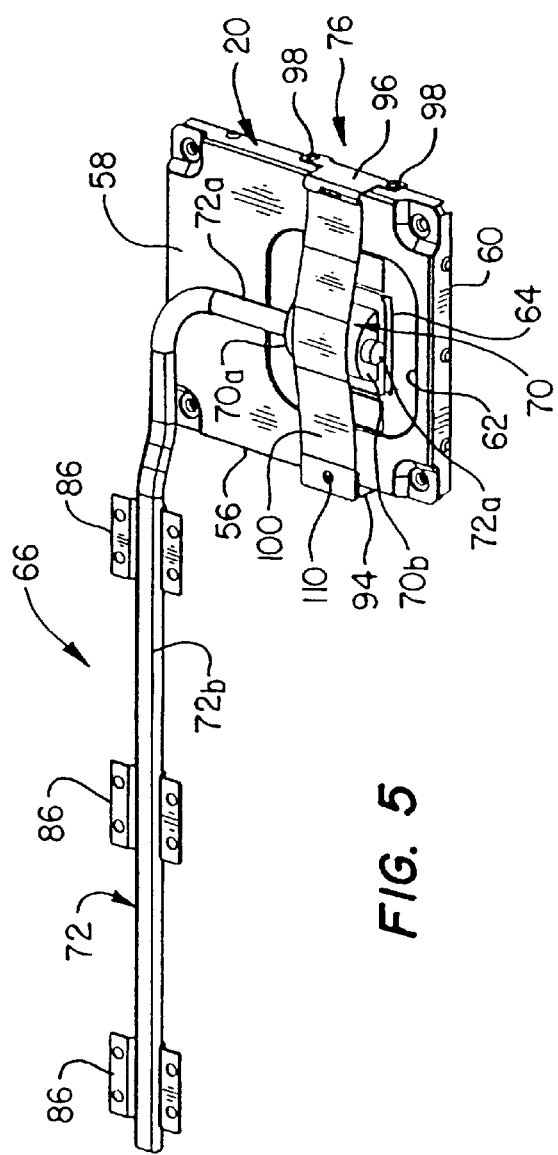
FIG. 5 is an enlarged scale top side perspective view of the microprocessor and associated heat dissipation apparatus.
FIG. 6 is a top side perspective view similar to that shown in FIG. 5, but additionally illustrating a portion of a sheet metal EMI shield wall overlying the microprocessor and supporting a heat pipe portion of the heat dissipation apparatus.

This connection of the heat pipe portion 72b to the metal shield wall 42 places the heat pipe evaporating end portion 72a, and the heat sink member 70 which is pivotally mounted thereon, in a cantilevered, resiliently deflectable relationship with the underside 42b of the metal shield wall 42. Thus, the heat sink member 70 may be resiliently deflected, as later described herein, downwardly away from the shield wall 42 toward the die 64. In addition to improving the heat transfer from the heat pipe 72 to the shield wall 42, the flattening of the heat pipe portion 72b also facilitates the deflection of the heat sink member 70 toward the die 64. The heat sink member 70, as best illustrated in FIG. 6, underlies a rectangular opening 88 in the shield wall 42. Downturned wall tabs 90 on opposite sides of the opening 88 (see FIG. 6) are positioned outwardly adjacent the opposite ends 70a,70b of the heat sink member 70, and is overlie portions of the heat pipe condensing end section 72a and define stops which, when abutted by such heat pipe portions, limit the upward movement of the heat sink member 70 relative to the EMI shield wall 42.

The clamping structure 76, by exerting a resilient force on the heat sink member 70, functions to downwardly press the flat bottom side 78 of the heat sink member 70 against the top side of the phase change thermal pad 68, thus pressing the thermal pad 68 downwardly against the top side 64a of the die 64. Clamping structure 76 includes (1) a generally U-shaped metal base plate portion 92 that extends across the bottom side 60 of the processor housing 56 and has upturned opposite side portions 94 and 96 that extend upwardly along opposite vertical sides of the processor housing 56 and are secured thereto by screws 98, and (2) an elongated rectangular spring plate portion 100 that extends along the arcuate top side 80 of the heat sink member 70.

Cooling fan 74, as schematically illustrated in FIGS. 6 and 7, is mounted in a notched end area 102 of the shield wall 42 and is positioned within the interior of the base housing 26 in an inwardly adjacent, facing relationship with an air discharge opening structure 104 formed in the left end wall 32 of the base housing 26 (see FIG. 4). During operation of the fan 74, ambient cooling air 106 (see FIG. 2) is sequentially drawn inwardly through an air intake opening area 108 in the right end wall 34 of the base housing 26 into the interior of the base housing 26, flowed through the interior of the base housing along the top and bottom sides 42a,42b of the metal shield wall 42, and then flowed through the fan 74 and discharged outwardly through the air discharge opening structure 104 (see FIG. 4).

The heat dissipation apparatus 66 is thermally connected to the processor die 64 (see FIG. 3) by placing the phase change thermal pad 68 on the top side of the die 64, and positioning the heat sink member 70, flat side 78 down, over the pad 68 as schematically indicated in FIG. 3. An upturned right end portion 100a of the spring plate member 100 is then releasably retained under a curved upper end portion 96a of the vertical side portion 96 of the clamping structure base portion 92, and the spring plate member 100 is leftwardly bent over the arcuate top side 80 of the heat sink member 70 pivotally mounted on the cantilevered heat pipe evaporating end portion 70a until a left end portion 100b of the spring plate member 100 downwardly engages the upper end of the left vertical side portion 94 of the clamping structure base portion 92.

Still referring to FIG. 3, the left spring plate member end portion 100b is then releasably secured to the upper end of the vertical side portion 94 by a screw 110. The bending over the curved top side 80 of the heat sink member 70 of the elongated spring plate member 100 exerts a resilient downward force on the heat sink member 70 and resiliently deflects the cantilevered heat pipe evaporating end portion 72a downwardly to thereby resiliently press the flat bottom side 78 of the heat sink member 70 against the phase change thermal pad 68 to correspondingly press the pad 68 downwardly against the top side 64a of the heat-generating die 64 and operatively place the heat sink member 70 in heat-receiving proximity to the top side surface 64a of the recessed die 64. The use of the spring plate member 100 serves to automatically preclude the exertion of an excess clamping contact pressure on the die 74, regardless of how tightly the screw 110 is threaded into the vertical side portion 94.

During operation of the portable computer 24, operating heat generated by the die 64 is transferred sequentially through the phase change pad 68 to the heat sink member 70, from the heat sink member 70 to the evaporating end portion 72a of the heat pipe 72 via the annular layer of thermal grease 84, from the heat pipe end portion 72a to the metal shield wall 42 via the condensing end portion 72b of the heat pipe 72, and from the metal shield wall 42 to the cooling air 106 being flowed along the opposite sides 42a,42b of the metal shield wall 42 and then discharged from the base housing 26 via the air discharge opening structure 104.

The resiliently deflectable mounting of the heat sink member 70 on the cantilevered heat pipe evaporating end portion 72a, coupled with the resilient downward clamping force exerted on the heat sink member 70 permits the heat dissipation apparatus 66 to automatically compensate for variances in the bond line distance of the microprocessor 20, while at the same time providing a controllable resilient clamping force on the die 64. Specifically, the spring plate member 100 can easily be designed in a manner such that when the bond line distance is at the lower limit of its tolerance range the clamping force on the die 64 does not exceed its maximum permitted value.

This unique feature of the heat dissipation apparatus 66 makes it substantially independent of the bond line thickness of the microprocessor 20, and further eliminates the previous necessity of using thermal grease at the interface between the top side of the die and the heat sink portion of the die heat dissipation apparatus. In place of the undesirable thermal grease interface, the apparatus 66 advantageously permits the use of the compressible interface pad 68. Since the pad in its uncompressed state does not have to project upwardly beyond the top side 58 of the processor housing 56 it can be of a very small thickness (as schematically illustrated in FIG. 3) to thereby provide a highly efficient heat conduction path between the die 64 and the heat sink member 70

The unique shape of the heat sink member 70, with its arcuate top side 80 and its flat bottom side 78, coupled with the pivotal mounting of the heat sink member 70 on the evaporating end portion 72a of the thermosyphoning heat pipe 72 makes the heat dissipation apparatus 66 self-adjusting in another manner. Specifically, in the event that the flat bottom side 78 of the heat sink member 70 is not precisely parallel to the top side 64a of the die 64 before the spring plate member 100 is installed, the subsequent downward force of the spring plate member 100 on the curved upper side 80 of the heat sink member 70 will automatically pivot the heat sink member 70 about the heat pipe end portion 72a, when the bottom side of the heat sink member initially contacts the phase change thermal pad 68, in a manner such that the flat bottom side 78 of the heat sink member 70 bears against the pad 68 in a precisely parallel relationship with the top side 64a of the die 64.

While a preferred embodiment of the heat dissipation apparatus 66 has been representatively illustrated as being utilized in conjunction with a microprocessor in a portable computer, it will be readily appreciated by those of skill in this particular art that heat dissipation principles of the present invention could also be advantageously utilized in conjunction with a variety of other types of heat-generating components incorporated in other types of computers or electronic apparatus, the heat dissipation apparatus 66 not being limited to use in conjunction with a recessed processor die surface.

The foregoing detailed description is to be clearly understood as being given by way of illustration and example only, the spirit and scope of the present invention being limited solely by the appended claims.

What is claimed is:

1. A heat removal system, comprising:
   a portable computer having a cooled component, a heat dissipation system and an EMI shield wall, the heat dissipation system comprising a heat sink biased against the cooled component by a spring member, the heat dissipation system being fastened to the EMI shield wall, the heat sink and the spring member being configured for abutting engagement at various positions along an arc.

2. The heat removal system as recited in claim 1, wherein the heat dissipation system further comprises a heat pipe coupled to the heat sink.

3. The heat removal system as recited in claim 2, wherein the heat pipe is pivotably coupled to the heat sink.

4. The heat removal system as recited in claim 2, wherein the spring member comprises a spring plate.

5. The heat removal system as recited in claim 2, further comprising a cooling fan coupled to the heat pipe.

6. The heat removal system as recited in claim 2, wherein the heat dissipation system further comprises a thermal interface pad disposed between the heat sink and the cooled component.

7. The heat removal system as recited in claim 1, wherein the cooled component comprises a heat generating component.

8. The heat removal system as recited in claim 7, wherein the heat generating component comprises a microprocessor.

9. An electronic device, comprising:
   a heat generating component; and
   a heat dissipation system having a clamping structure disposed around the heat generating component, a heat sink and a heat sink retention member coupled to the clamping structure in abutting engagement with the heat sink to hold the heat sink against the heat generating component, wherein the heat sink comprises a generally flat surface disposed adjacent the heat generating component and an arcuate surface disposed against the heat sink retention member.

10. The electronic device as recited in claim 9, wherein the heat generating component comprises a microprocessor.

11. The electronic device as recited in claim 9, wherein the heat sink retention member comprises a spring member.

12. The electronic device as recited in claim 9, wherein the heat dissipation system further comprises a heat pipe coupled to the heat sink.

13. A heat dissipation system, comprising:
- a heat sink having a heat transfer surface to engage a desired component;
- a spring member acting against the heat sink to bias the heat sink towards the desired component; and
- a heat pipe pivotably coupled to the heat sink, wherein the heat sink has a surface opposite the heat transfer surface, the surface being positioned for abutting contact with the spring member at various points along an arc, depending on the orientation of the spring member with respect to the heat sink.

14. The heat dissipation system as recited in claim 13, wherein the heat transfer surface is a generally flat surface.

15. The heat dissipation system as recited in claim 14, further comprising a thermal interface pad disposed between the generally flat surface and the desired component.

16. The heat dissipation system as recited in claim 15, further comprising an EMI shield wall to which the heat pipe is secured via at least one bracket.

17. An electronic device, comprising:
- an EMI shield wall; and
- a heat dissipation system coupled to the EMI shield wall, the heat dissipation system further being engaged with a component from which heat is to be transferred, wherein the heat dissipation system comprises a slug positioned to transfer heat from the component, the slug comprising a heat transfer surface and an arcuate surface opposite the heat transfer surface.

18. The electronic device as recited in claim 17, wherein the slug comprises an opening, the heat dissipation system further comprising a heat pipe pivotably received in the opening.

19. The electronic device as recited in claim 18, wherein the heat pipe is connected to the EMI shield wall.

20. The electronic device as recited in claim 19, wherein the slug is spring biased towards the component.

* * * * *